United States Patent [19]

Schulz

[11] 4,325,768
[45] Apr. 20, 1982

[54] METHOD OF MANUFACTURING FIBROUS SHEET STRUCTURE

[75] Inventor: Galyn A. Schulz, Appleton, Wis.

[73] Assignee: American Can Company, Greenwich, Conn.

[21] Appl. No.: 103,653

[22] Filed: Dec. 14, 1979

Related U.S. Application Data

[62] Division of Ser. No. 21,915, Mar. 19, 1979, abandoned.

[51] Int. Cl.³ .............................................. B32B 31/20
[52] U.S. Cl. ................................... 156/206; 156/209; 156/210
[58] Field of Search ...................... 162/117, 113, 205; 156/207, 209, 582, 205, 206, 210; 428/166, 171, 178, 184, 154, 183; 264/258, 263, 284, 293, 294, 296, 324

[56] References Cited

U.S. PATENT DOCUMENTS

| Re. 20,034 | 7/1936 | Ives ....................................... 428/183 |
| 2,974,716 | 3/1961 | Fourness ............................... 428/183 |
| 3,556,907 | 1/1971 | Nystrand ............................... 156/209 |
| 3,650,882 | 3/1972 | Thomas .................................. 428/154 |
| 3,694,300 | 9/1972 | Small ..................................... 156/209 |
| 3,738,905 | 6/1973 | Thomas ................................. 428/184 |
| 3,775,231 | 11/1973 | Thomas ................................. 428/110 |
| 3,935,360 | 1/1976 | Brown ................................... 428/186 |
| 3,940,529 | 2/1976 | Hepford et al. ....................... 428/184 |
| 3,953,638 | 4/1976 | Kemp .................................... 156/209 |
| 4,131,663 | 12/1978 | Lenichi, Jr. ........................... 156/209 |

FOREIGN PATENT DOCUMENTS 736410 9/1955 United Kingdom ................ 156/207

*Primary Examiner*—Stanley S. Silverman
*Attorney, Agent, or Firm*—Robert P. Auber; George P. Ziehmer; Harry W. Hargis, III

[57] ABSTRACT

In the manufacture of a multi-ply fibrous sheet structure, each of a pair of plies of fibrous web material is provided with a spot embossed first pattern defined by inwardly directed nested protuberances that are adhesively joined at distal surfaces thereof to confronting surfaces of the opposite ply, and the adhesively joined plies are provided with a spot embossed second pattern defined by registered, unidirectionally presented protuberances in each of the joined plies and fitted compactly one within the other.

1 Claim, 6 Drawing Figures

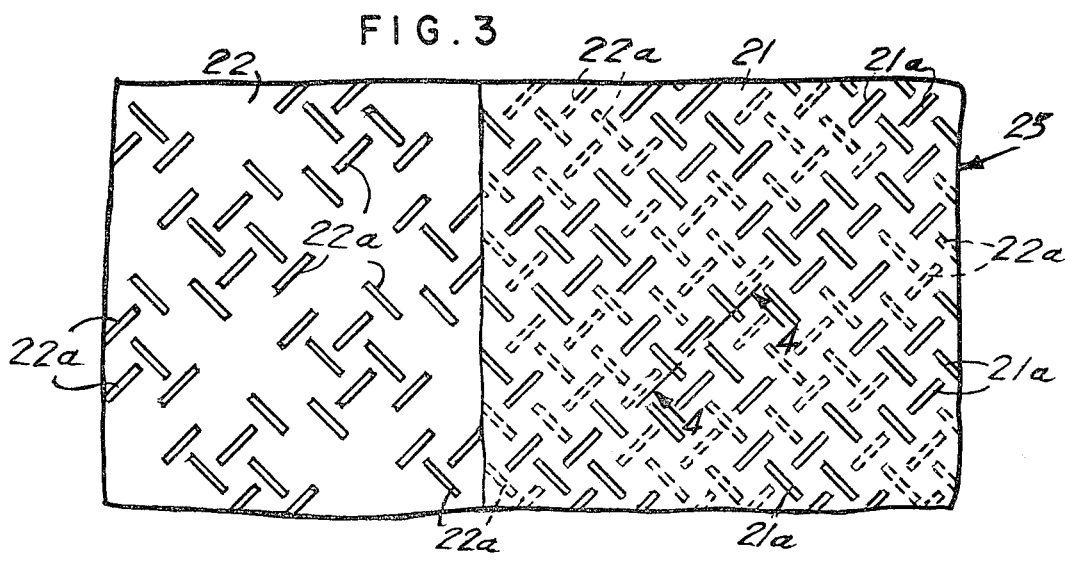
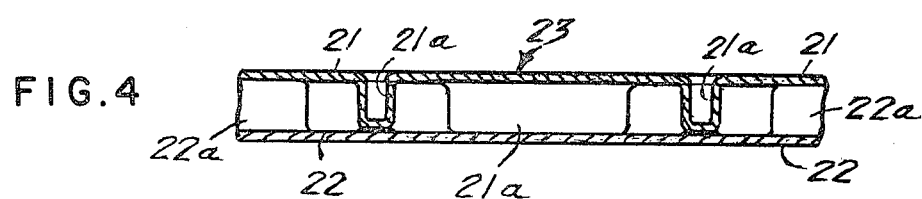
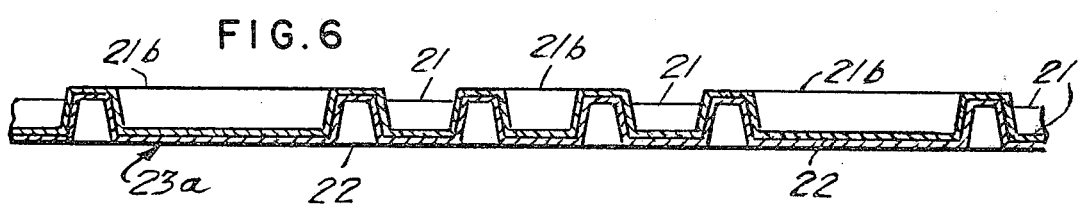
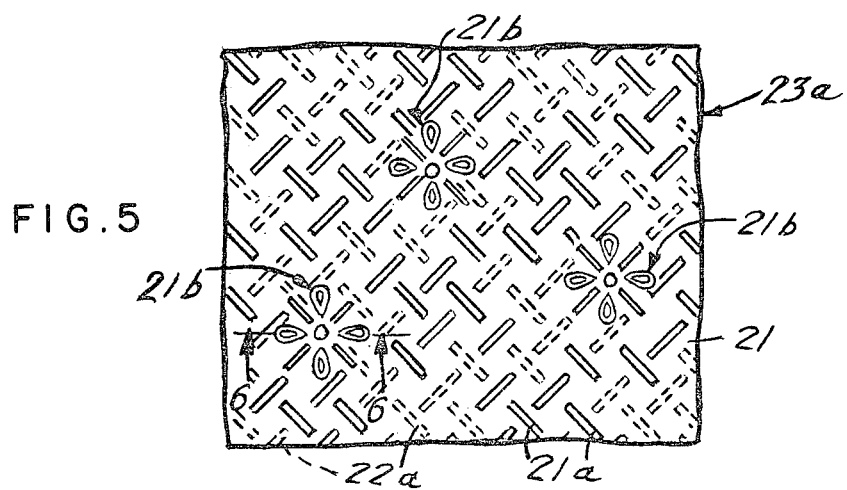

METHOD OF MANUFACTURING FIBROUS SHEET STRUCTURE

This is a division of application Ser. No. 021,915, filed Mar. 19, 1979 now abandoned.

BACKGROUND OF THE INVENTION

This invention relates to improvements in the manufacture of multi-ply fibrous sheet structure, particularly of the soft absorbent type such as, for example, paper towels.

In the manufacture of paper towels, efforts have been directed to improving important product qualities such as softness, water absorbency, and bulk. Softness, absorbency, and a degee of bulk have been imparted to multiply fibrous sheet structure by provision of highly repetitive patterns of relatively closely spaced emboss elements in confronting plies. For aesthetics, a further desirable product quality, color patterns larger than the emboss elements have been applied. Softness, absorbency, bulk, and aesthetics have been enhanced by application of decorative, relatively widely spaced spot emboss elements to confronting non-embossed creped plies, with or without application of color.

The following documents are representative of the prior art, and are believed material to the Examination of this application:

U.S. Pat. No. 2,834,809 discloses embossing rolls 22, 23 having meshed protuberances 24 and depressions 24 for embossing a single ply of base stock 21 to form absorbent paper 20.

U.S. Pat. No. 3,556,907 discloses rolls 12, 13 for embossing separate plies 15 and 23 to form meshed embosses 17 and 25.

U.S. Pat. No. 3,673,060 discloses creped tissue webs joined by adhesive spots 34 upon passage between laminating rolls 28, 30. The joined webs are embossed upon passage between embossing rolls 31, 32.

U.S. Pat. No. 3,775,231 discloses identical embossments A, B, and C formed by passing a web 10 through three embossing stations defined by rubber rolls 13, 15, or 16 disposed about a single embossing roll 12.

Copending U.S. Patent Application of the present inventor, Ser. No. 116,230, filed Jan. 28, 1980, a continuation of abandoned application Ser. No. 1,741, filed Jan. 8, 1979, now abandoned and assigned to the assignee of the present invention, discloses a spot emboss pattern applied to one side of a multi-ply fibrous sheet structure.

It is an objective of the present invention to provide a multi-ply fibrous sheet structure characterized by improved softness, absorptivity, bulk, and aesthetics through inclusion of a novel combination of relatively small, closely spaced emboss elements with relatively large, less closely spaced spot emboss elements.

It is a further objective of my invention to provide an improved method and apparatus for forming multi-ply fibrous sheet structure of improved absorptivity, softness, bulk and aesthetics.

SUMMARY OF THE INVENTION

In achievement of the foregoing as well as other general objectives and advantages, the invention contemplates fabrication of a multi-ply fibrous sheet structure comprising the provision, on each of a pair of plies of fibrous web material, of an embossed first pattern defined by inwardly directed, nested protuberances at least some of which are adhesively joined at distal surfaces thereof to confronting surfaces of the opposite ply, and provision on the adhesively joined plies of a second embossed pattern including registered, undirectionally presented protuberances in each of the joined plies and fitted compactly, one within the other.

The manner in which the objectives and advantages of the invention may best be achieved will be more fully understood from a consideration of the following description, taken in light of the accompanying drawing.

BRIEF DESCRIPTION OF THE DRAWING

FIG. 3 is a fragmented top plan view of the partially embossed fibrous sheet structure, looking in the direction of arrows 3—3 in FIG. 1;

FIG. 4 is an enlarged fragmented sectional view taken in the plane of line 4—4 in FIG. 3, looking in the direction of arrows applied thereto.

FIG. 5 is a fragmented top plan view of the fully embossed fibrous sheet structure contemplated by the invention looking in the direction of arrows 5—5 in FIG. 1; and FIG. 6 is an enlarged fragmented sectional view of a portion of the product taken in the plane of line 6—6 in FIG. 5, looking in the direction of arrows applied thereto.

DESCRIPTION OF THE PREFERRED EMBODIMENTS AND PRACTICE OF THE INVENTION

Figure 1:
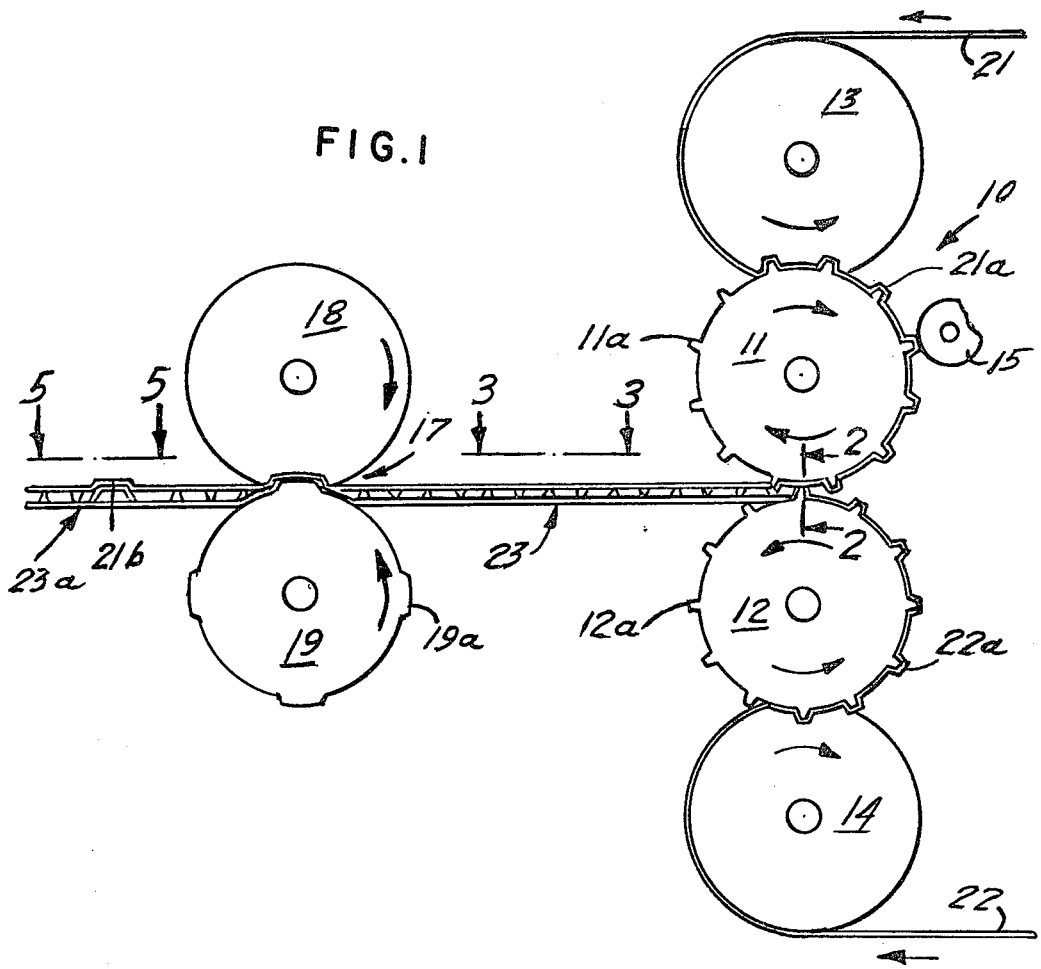
FIG. 1 is a diagrammatic elevational view of apparatus contemplated by the invention.

With more detailed reference to the drawing, and first to FIG. 1, an apparatus 10 includes a pair of embossing rolls 11 and 12 made of substantially rigid material, such as steel, provided with meshing like patterns to be described in detail in what follows. Rolls 11 and 12 are of like diameter, are mounted for rotation about parallel axes by suitable drive means of known construction, and are so cooperably disposed as to form a ply bonding nip.

A pair of embossing backup rolls 13 and 14 made of substantially flexible and resilient material, such as rubber, are mounted for rotation about parallel axes by known suitable drive means, and are so cooperably disposed as respects steel rolls 11 and 12, respectively, to form embossing nips therewith.

A pair of webs 21 and 22 of paper, such as, for example, creped coarse fiber stock such as is used in paper toweling, are fed from suitably arranged supply means (not shown) over rubber backup rolls 13 and 14, respectively. Web 21 is then fed between rolls 11 and 13 while web 22 is fed between rolls 12 and 14, and, as is seen from the showings of FIGS. 2, 3 and 4, there is formed in each web the spot embossed patterns defined by protuberances 11a and 12a on rolls 11 and 12.

Adhesive applicator means of conventional construction includes an applicator roll 15 disposed for tangential engagement with web 21 on embossing roll 11. As web 21 is fed past applicator roll 15, adhesive is applied to distal ends of emboss protuberances 21a. Continued rotation of the rolls drives webs 21 and 22 into the nip of rolls 11 and 12 from which the webs exit as a partially completed multi-ply sheet structure 23, each ply of which includes, as is seen to advantage in FIGS. 3 and 4, a first spot embossed pattern defined by inwardly directed, relatively closely spaced, nested protuberances 21a, 22a.

In especial accordance with the invention, and with reference again to FIG. 1, a combined secondary embossing and laminating station 17 is provided in apparatus 10 and comprises a flexible and resilient embossing backup roll 18 and a substantially rigid embossing roll 19, each mounted for rotation about an axis parallel to the other and forming a laminating nip through which sheet structure 23 passes adhesively to join distal ends of protuberance 21a to confronting surface of the opposite ply. As is seen to further advantage in FIGS. 5 and 6, embossing and laminating roll 19 is provided with a pattern of protuberances 19a that imparts a larger, more widely spaced second, spot embossed pattern comprising protuberances 21b of greater extent transversely of the sheet structure than the protuberances of rolls 11 and 13. Sheet structure 23 is therefore transformed into an embossed sheet structure 23a of enhanced absorptivity, softness and bulk, wherein the protuberances defining a first pattern are directed inwardly toward the opposite ply and the protuberances defining a second pattern are registered, and unidirectionally presented in each of the joined plies and are fitted compactly one within the other.

Figure 2:
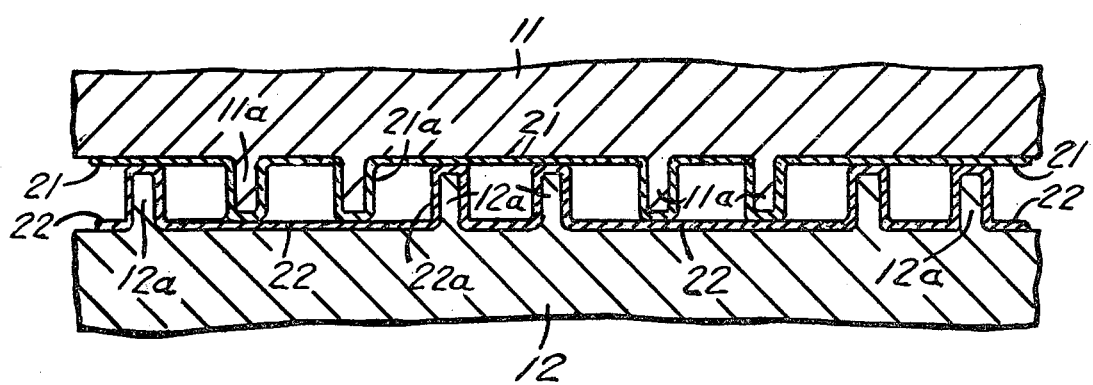
FIG. 2 is an enlarged fragmented sectional view of a portion of the apparatus and product taken in the plane of line 2—2 in FIG. 1, and looking in the direction of arrows applied thereto.

Considering the emboss patterns in more detail, and the improved apparatus for achieving same, it is best seen in FIG. 2 that the meshed protuberances 11a and 12a extend radially from steel rolls 11 and 12, respectively, to within a very short distance from the surface of the opposite roll. As is seen in FIG. 3, the protuberances 11a and 12a define a closely spaced pattern featured by clusters of T-shaped elements which mesh with one another so that they produce a similar pattern of embossed protuberances 21a, 22a on each web 21 and 22, at least some of which in the laminating nip are urged into engagement for adherence with intervening portions of an opposed web. The second, spot embossed pattern is featured by registered protuberances 21b compactly fitted one within the other and, arranged in a floral pattern for aesthetics to impart additional bulk to the already embossed two-ply sheet structure 23a.

In the embodiments thus far described, protuberances 11a and 12a have been illustrated as being in provision of nested web protuberances 21a and 21a. It will be understood, however, that they may be positioned to form point-to-point web protuberances. Protuberances 21a and 22a may also take shapes other than the linear configuration illustrated. For example, they may take the form of circular spots, or they may be formed as continuous line embossed elements. Also, the protuberances 21b may take other shapes than the illustrated floral pattern, so lone as the selected shape achieves the desired bulk and aesthetics. These and other changes are contemplated by the scope of the appended claims.

I claim:

1. In the manufacture of multi-ply fibrous sheet structure, the method comprising: embossing each of a pair of fibrous webs with a plurality of crest and depressions of a first pattern on a surface of each; disposing said webs with said surfaces facing each other and with the crests on each web positioned between the crests on the other web, and extending beyond the crests on the other web toward the depressions on the other web; portions interconnecting crests and depressions of one web being laterally spaced from portions interconnecting crests and depressions of the other web; adhesively joining at least some of said crests of one web to the depressions of the other web, to join said webs to form a sheet; and embossing said sheet with a plurality of registered crests and registered depressions of a second pattern in each said web fitted compactly within one another throughout the extents of said crests and depressions, so that crests of the second pattern in one of the webs extend beyond and are spaced from the plane of the portion of said one web having said first pattern of crests and depressions, the crests and depressions of said first pattern being more closely spaced than the crests and depressions of said second pattern.

* * * * *